United States Patent
Koeninger

(10) Patent No.: US 10,110,452 B2
(45) Date of Patent: Oct. 23, 2018

(54) SMART INTERNET AND POWER CONNECTOR

(71) Applicant: International Business Machines Corporation, Armonk, NY (US)

(72) Inventor: R Kent Koeninger, Nashua, NH (US)

(73) Assignee: International Business Machines Corporation, Armonk, NY (US)

(*) Notice: Subject to any disclaimer, the term of this patent is extended or adjusted under 35 U.S.C. 154(b) by 142 days.

(21) Appl. No.: 15/219,685

(22) Filed: Jul. 26, 2016

(65) Prior Publication Data

US 2017/0034022 A1 Feb. 2, 2017

Related U.S. Application Data

(60) Provisional application No. 62/197,328, filed on Jul. 27, 2015.

(51) Int. Cl.
*H04L 12/26* (2006.01)
*H04L 12/24* (2006.01)

(52) U.S. Cl.
CPC ...... *H04L 43/0811* (2013.01); *H04L 41/0672* (2013.01); *H04L 43/0817* (2013.01); *H04L 43/065* (2013.01); *H04L 43/10* (2013.01)

(58) Field of Classification Search
CPC . H04L 43/065; H04L 43/0811; H04L 41/0672
See application file for complete search history.

(56) References Cited

U.S. PATENT DOCUMENTS

| | | | | |
|---|---|---|---|---|
| 6,691,248 B1* | 2/2004 | Nishijima | ............ | G06F 1/30 714/14 |
| 7,616,577 B2* | 11/2009 | Burns | ............ | H04L 12/2896 370/241 |
| 2006/0206741 A1* | 9/2006 | Allison | ............ | G06F 1/266 713/340 |
| 2009/0013210 A1* | 1/2009 | McIntosh | ............ | H04L 41/0672 714/4.1 |
| 2012/0147739 A1* | 6/2012 | Chueh | ............ | H04L 41/0663 370/221 |
| 2016/0197786 A1* | 7/2016 | Britt | ............ | H04W 4/70 370/255 |
| 2016/0198536 A1* | 7/2016 | Britt | ............ | H02J 7/0042 315/149 |
| 2016/0378102 A1* | 12/2016 | Goodrich | ............ | G05B 19/4155 700/9 |

* cited by examiner

*Primary Examiner* — Chi H Pham
*Assistant Examiner* — Fahmida Chowdhury
(74) *Attorney, Agent, or Firm* — Jeffrey S LaBaw; Robert Sullivan; Feb R Cabrasawan

(57) ABSTRACT

A method for protecting a computer system is performed by a smart connector is described. The smart connector tests an Internet connection provided by an Internet hub. The connector reboots the Internet hub if the testing detects a problem in the Internet connection. Then, the connector tests the Internet connection after rebooting the Internet hub. If the problem persists after rebooting the Internet hub, the connector sends a hub problem notification. The components of the smart connector are also described.

20 Claims, 5 Drawing Sheets

SMART INTERNET AND POWER CONNECTOR

TECHNICAL FIELD

Various embodiments of the invention relate to methods and systems for providing robust Internet connection or power supply to computer systems.

BRIEF SUMMARY

According to this disclosure, a method for protecting a computer system is performed by a smart connector. The smart connector tests an Internet connection provided by an Internet hub. The connector reboots the Internet hub if the testing detects a problem in the Internet connection. Then, the connector tests the Internet connection after rebooting the Internet hub. If the problem persists after rebooting the Internet hub, the connector sends a hub problem notification. In another aspect of the invention, the components of the smart connector are also described.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate embodiments consistent with the disclosure. Together with the description, the drawings serve to explain the principles of the disclosure.

DETAILED DESCRIPTION OF THE DRAWINGS

Figure 1:
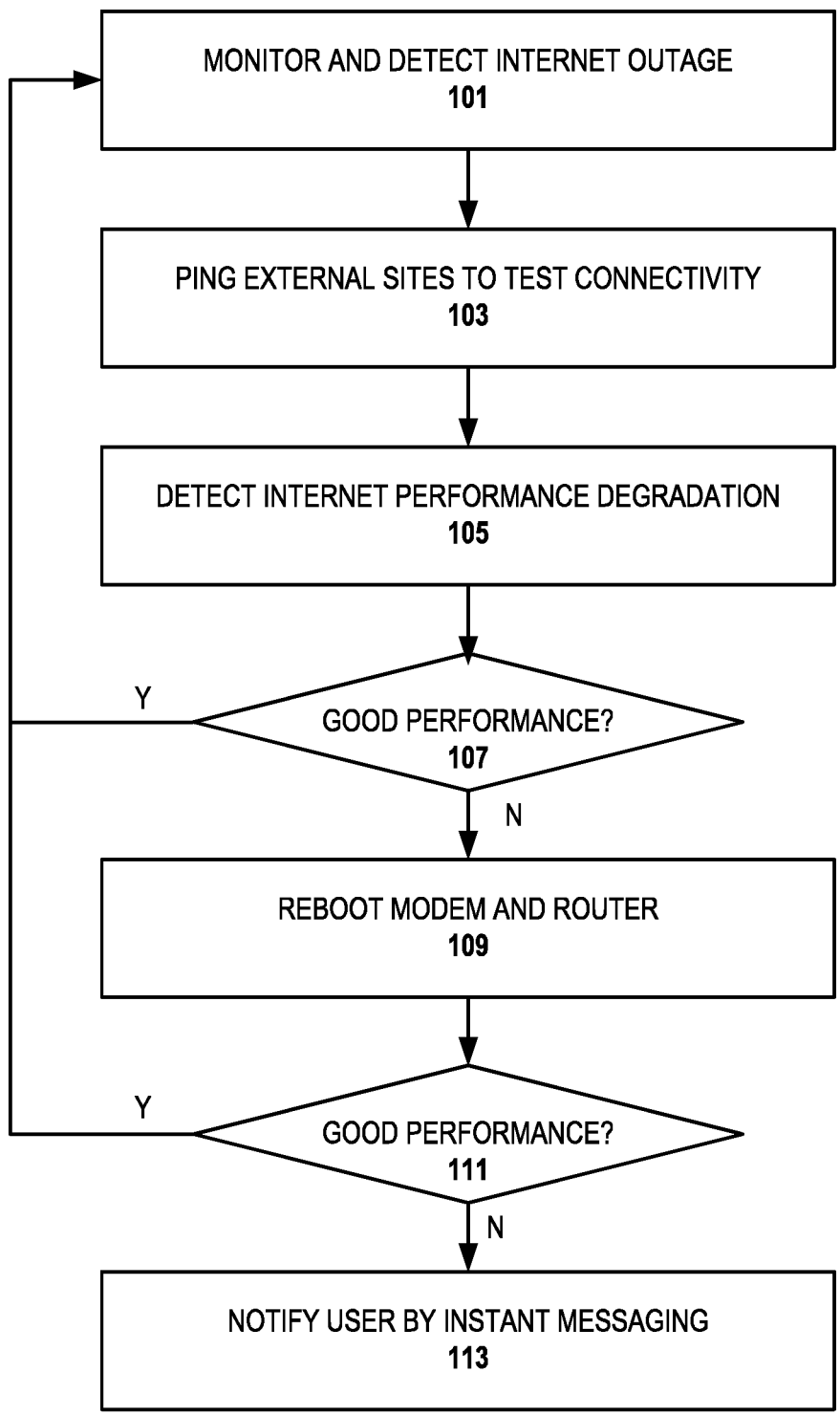
FIG. 1 illustrates a flow diagram of a preferred embodiment of a process that may be programmed into the smart connector or constant connection system.

The following detailed description refers to the accompanying drawings. The same or similar reference identifications may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments. Various embodiments disclose methods and system for Internet or power resiliency as described below. In some preferred embodiments of the invention, the system is called a constant connection (CC) system, in others, the system is called a smart connector; the terms are used interchangeably in this disclosure.

The following describes some of the features in various embodiments and the mechanisms for implementing those features. Some embodiments include a smart connector that provides robust connection of a computer system to the Internet. In the embodiments, the smart connector provides robust connection of the computer system to the power supply by providing an Uninterrupted Power Supply (UPS). In some embodiments, the smart connector provides both the robust connection to the Internet and the UPS.

At a high level, embodiments of the invention re-establish Internet connectivity for the majority of cases when Internet modems and routers go offline or degrade service, e.g., when the Internet Service Provider (ISP) is down, or when the power is out. Embodiments of the invention are useful for home use to minimize Internet outages. Other embodiments are useful in a "lights-out" computer room. Embodiments of the invention are designed to minimize Internet outages by monitoring common conditions such as power and ISP outages and less common conditions such as such as over temperature, under temperature, and water leaks. Embodiments of the invention are able to power down and restore power to related auxiliary devices, for example, by using AC plugs that are under program control. A power down and power up will often fix many issues with such auxiliary equipment. Another feature of embodiments of the constant connection (CC) system is to maintain power during power outages.

FIG. 1 illustrates a flow diagram of a preferred embodiment of a process that may be programmed into the smart connector. In step 101, the smart connector system is monitoring the Internet connection to detect Internet outages. The outages may be due to problems from the service provider, or with the modem, or router. If an outage is detected, in preferred embodiments, a state of the Internet connection is set as "failed". The system pings external sites to test connectivity, step 103. If a response to the pinging is received, in preferred embodiments, the state of the Internet connection is changed to "degraded". Presuming that the system is proven to be connected to the Internet by the ping test, in step 105, tests are performed to detect Internet performance degradation. For example, the system may stream music and video, or another large file, to check for smooth streaming. If the performance test indicates good performance, step 107, the process returns to monitor the Internet connection to detect Internet outages, step 101. In preferred embodiments, the state of the Internet connection is changed to "healthy" if the large file is received within a predetermined time.

If not, that is the test indicates poor performance, in step 109, the system reboots the modem and router to eliminate the degradation. If the reboot is successful, the system returns to monitoring, step 101. If the reboot is not successful, the system notifies user by sending a hub problem notification by instant messaging, step 113. In preferred embodiments, the system state is reported as a problem in the hub problem notification, if the Internet connection state is "failed" or "degraded".

Figure 2:
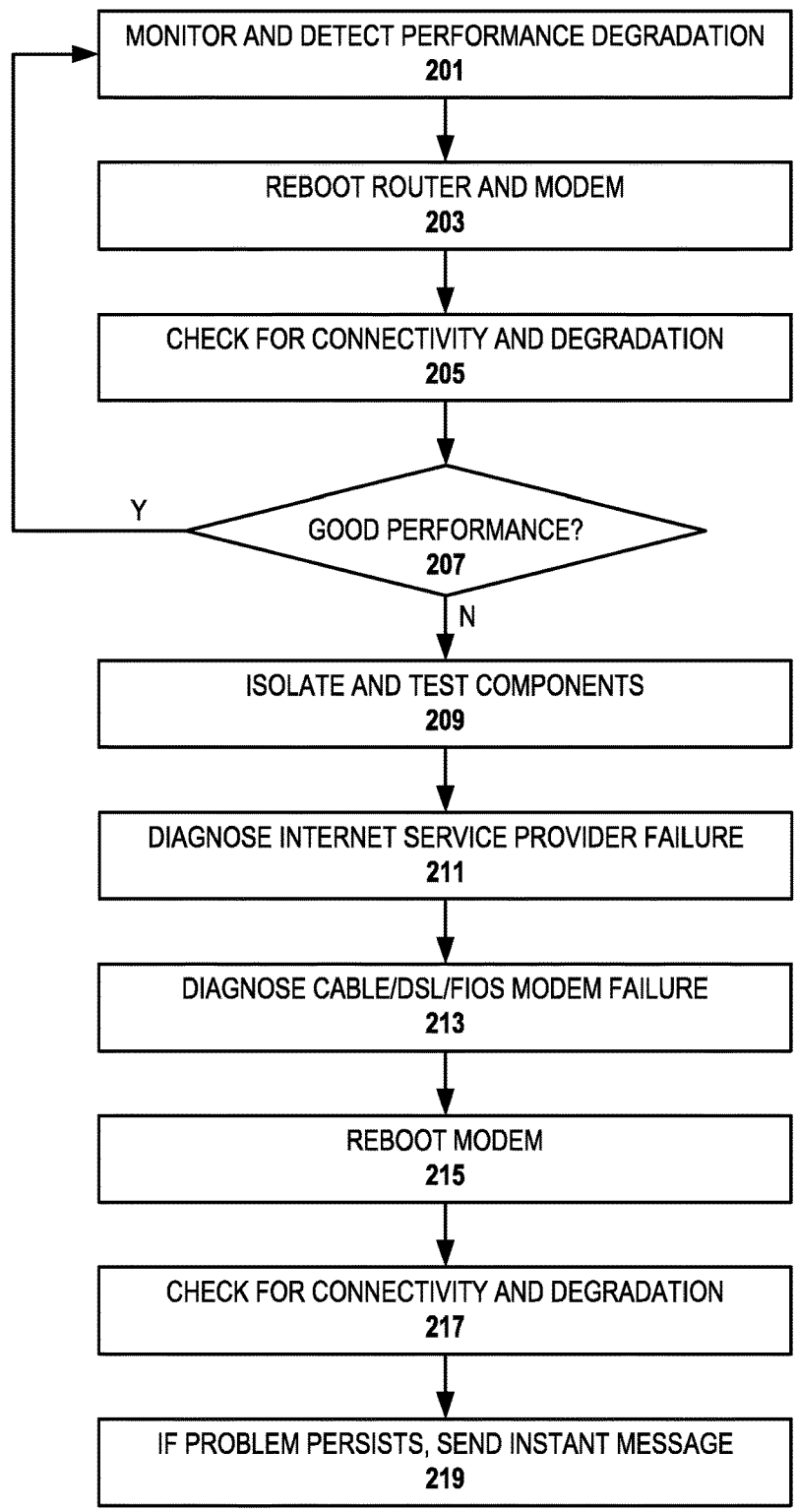
FIG. 2 illustrates a flow diagram of a preferred embodiment of a second process that may be programmed into the smart connector system.

FIG. 2 illustrates a flow diagram of a preferred embodiment of a second process or test that may be programmed into the smart connector system. In step 201, the system monitors for an Internet failure or performance degradation. If a problem is detected, in step 203, the system reboots router and modem during an Internet failure or performance degradation. In step 205, the checks for connectivity and degradation are performed as described above in association with FIG. 1. If good performance has been determined, the system goes back to monitoring for Internet failure or performance degradation, step 201.

If the rebooting does not restore service, the system proceeds to isolating the problem to particular components, step 209. In step 211, the system diagnoses Internet failures caused by the Internet service provider. In step 213, the system diagnoses failures due to the cable/DSL/FIOS modem. If a potential modem problem is detected, the system reboots the modem, step 215. After rebooting, the system checks for connectivity and degradation. If the problem persists, the system sends a hub problem notification by instant message to the user noting they should contact their service provider, step 219. The service provider would isolate the problem to their service or the modem.

Figure 3:
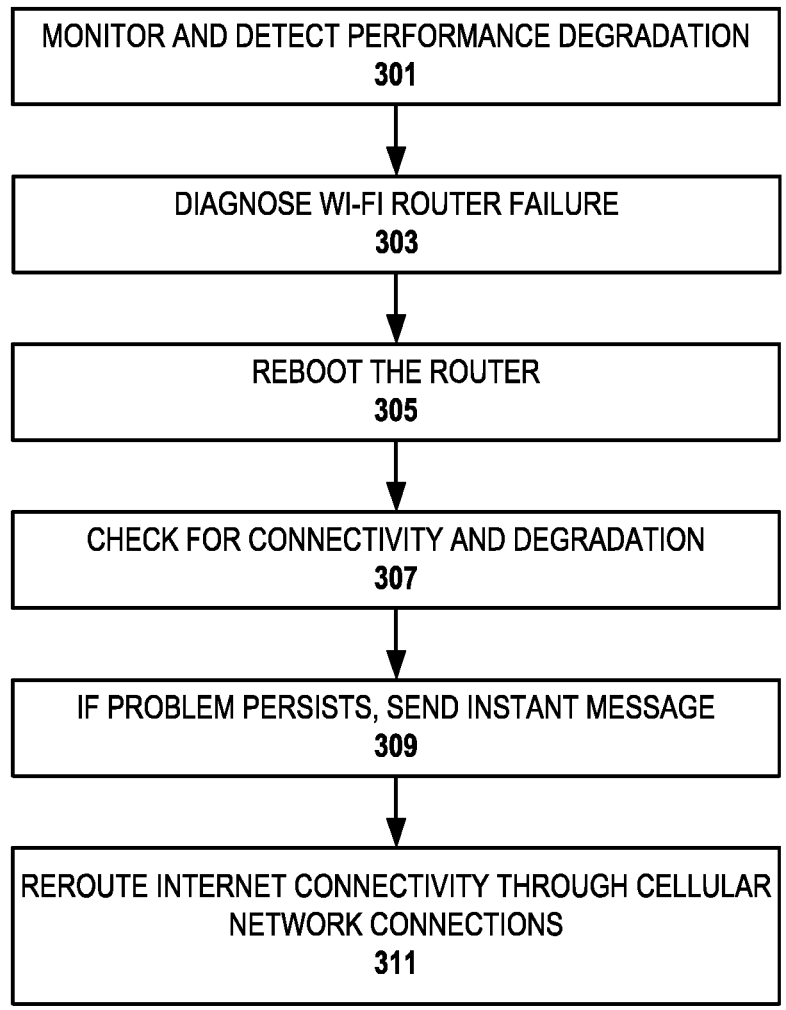
FIG. 3 illustrates a flow diagram of a preferred embodiment of a third process that may be programmed into the smart connector.

FIG. 3 illustrates a flow diagram of a preferred embodiment of a third process or test that may be programmed into the smart connector. In step 301, the system monitors for an Internet failure or performance degradation. In step 303, the system diagnoses one or more Wi-Fi router failures. Then, in step 305, the system reboots the router. Next, in step 307, the system checks for connectivity and degradation. If the problem persists, step 309, the system sends an instant message to the users, e.g., a hub problem notification advising them seek expert help to reconfigure or replace the router.

In preferred embodiments of the invention in which alternative routes are available to the Internet, the system reroutes Internet connectivity, e.g., through cellular network connections, step 311. The ability to reroute Internet connectivity when a hotspot is available is an advantage of embodiments of the invention when the ISP or Internet modem are down and when rebooting the modem did not fix the problem. Embodiments of the invention automatically reroute the Internet connection without the need to change network settings on each Wi-Fi or wired device. Some embodiments notify the user by instant messaging of this change. This mechanism allows for connectivity in areas with cellular connectivity, but no landline Internet connectivity, i.e. when a cellular hotspot is available.

Figure 4:
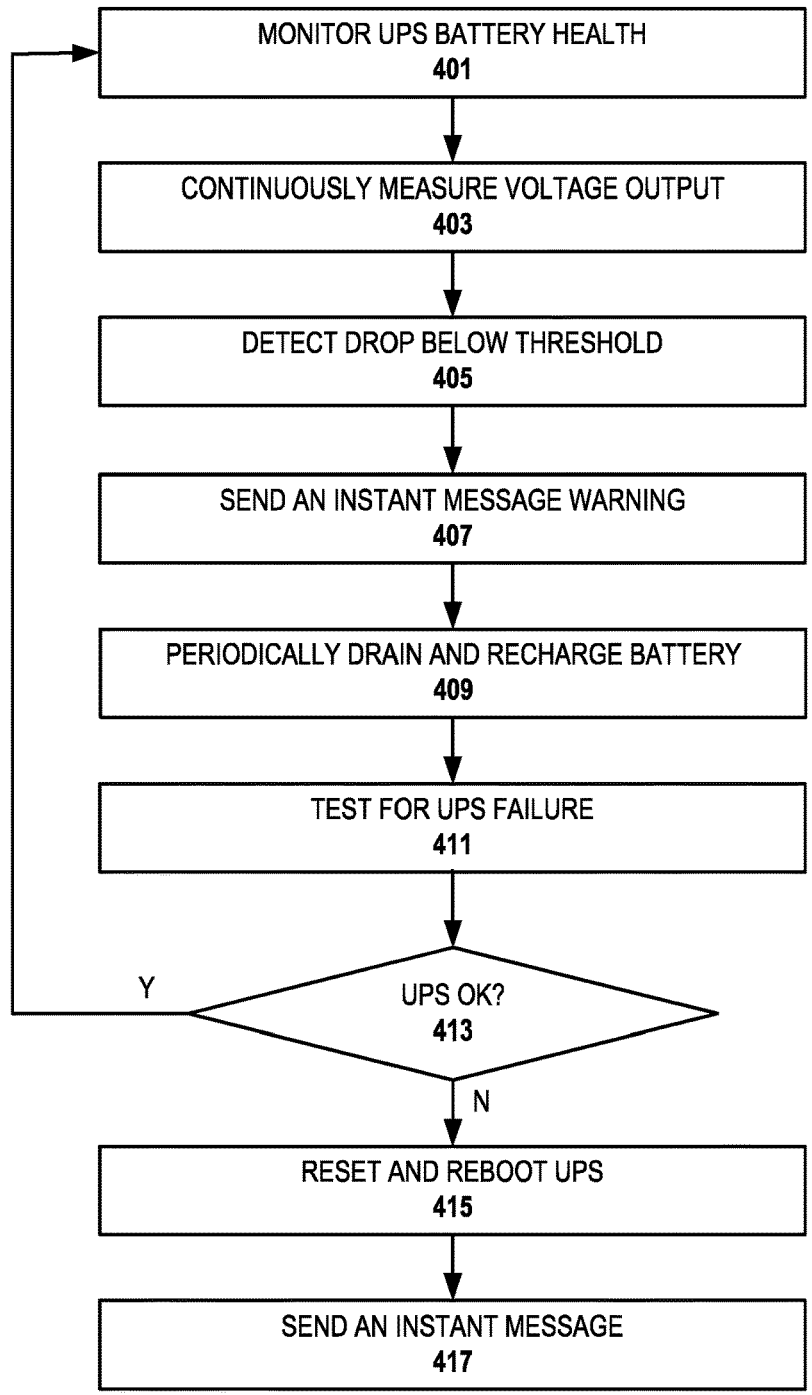
FIG. 4 illustrates a flow diagram of a preferred embodiment of a fourth process that may be programmed into the smart connector.

FIG. 4 illustrates a flow diagram of a preferred embodiment of a fourth process that may be programmed into the smart connector. In step 401, the system monitors UPS battery health. In step 403, the system continuously measures the UPS voltage output. If the system detects a drop below certain thresholds, step 405, the system sends an instant message warning of the UPS issue to the user, e.g., a hub problem notification or a UPS problem notification.

The process can also optimize UPS battery life in preferred embodiments. As shown in in step 409, once a month, or some other predetermined interval, the system drains the battery to 20% of battery life left and then recharges it. Those skilled in the art would recognize that other levels of battery charge could be used in alternative implementations of the invention. During recharge, the system monitors the voltage level to determine the remaining battery life.

Other tests for common UPS failures are included in some embodiments of the process, shown generally as step 411. For example, the system cuts the connection to an external power supply to the UPS using a timed switch under program control. If the unit continues to work, the UPS is OK, step 413, and the process returns to step 401. In preferred embodiments, the timed switch reconnects after a preset time if the timed switch is disconnected. If not, the program-controlled switch resets which restores power and causes the smart connector unit to reboot. If successful, the process returns to step 401. If not, the system sends an instant message, e.g., a UPS failure notification, noting that the UPS needs service. In preferred embodiments, if the UPS is OK a healthy UPS notification is sent, e.g., by instant message. In response to a successful reboot of the smart connector, the UPS failure test time is set to a large number in one preferred embodiment of the invention.

In a preferred embodiment of the invention, testing for a UPS failure includes setting a UPS failure test time to the present time. After an automatic reboot of the smart connector, the time of the last reboot of the smart connector is read. If the time of the last reboot is after the UPS failure test time, a failed UPS notification is sent, e.g., by instant message.

The hub problem notifications in the instant messages discussed above are preferably specific to report the detected anomalies and the suggested service through instant messaging. For example, in response to detecting a modem problem, a modem problem notification detailing the problem is sent. In response to detecting a router problem, a router problem notification detailing the problem is sent. If the UPS has failed, the smart connector sends a failed UPS notification. Instant messaging is a preferred means to send the hub problem notification as the system cannot report via email when the Internet is down.

In preferred embodiments, the smart connector uses other additional means to report status. In one embodiment, the system displays green, yellow and red LEDs to show status. Green indicates normal operation. A yellow LED indicates that preventative action is needed. If Internet connection is available, the user can check system status though a web page interface. A red LED indicates that the system has a serious issue.

In preferred embodiments, the system would receive automatic firmware upgrades from the company that, for example, supplied firmware. A web interface is used to setup and monitor the constant connection device. A preferred implementation uses an embedded-Linux microsystem with downloadable firmware. A web page interface is used for configuration and status. In the described embodiment in FIG. 5, the system has no integrated console or display. The system comes up running when batteries have failed and continues without discontinuity when AC power is restored. A built-in UPS with UPS battery maintains power during power outages.

Other embodiments of the invention can use other orders of Internet diagnosis than those described above in connection with FIGS. 1-4. For example, in response to a detected problem, the system could immediately reboot both the modem and router. Then, the system powers up the modem. The system waits for Internet connectivity which can be checked by pinging through a wired Ethernet port. Next, the system powers up the router. The system checks for router connectivity by pinging external sources with path from the constant connection device to router to modem to ISP. The example above is merely exemplary, and the order of any of the self-tests discussed above is not order dependent.

During a landline or modem outage or service degradation detected by the system, if rebooting the cable modem and Wi-Fi router do not fix the problem and a hotspot is available, in preferred embodiments, the system switches to a cellular hotspot, if a hotspot is present. Next, the system changes its routing path from the cable/DSL/FIOS modem's Internet address to the hotspot's Internet address. The system connects to a hotspot though its intranet Wi-Fi port.

Alternatively, to connect to dedicated or smartphone hotspots, the system routes that signal through a wired Ethernet connection to the Wi-Fi router. The router transmits to the Wi-Fi devices as normal. Other devices do not see a change in the network name or address. In preferred embodiments, the system UPS can maintain power to the hotspot device. In areas without landline Internet, but with cellular service, alternative embodiments of the invention maintain a hotspot connection using the same technique as above.

Figure 5:
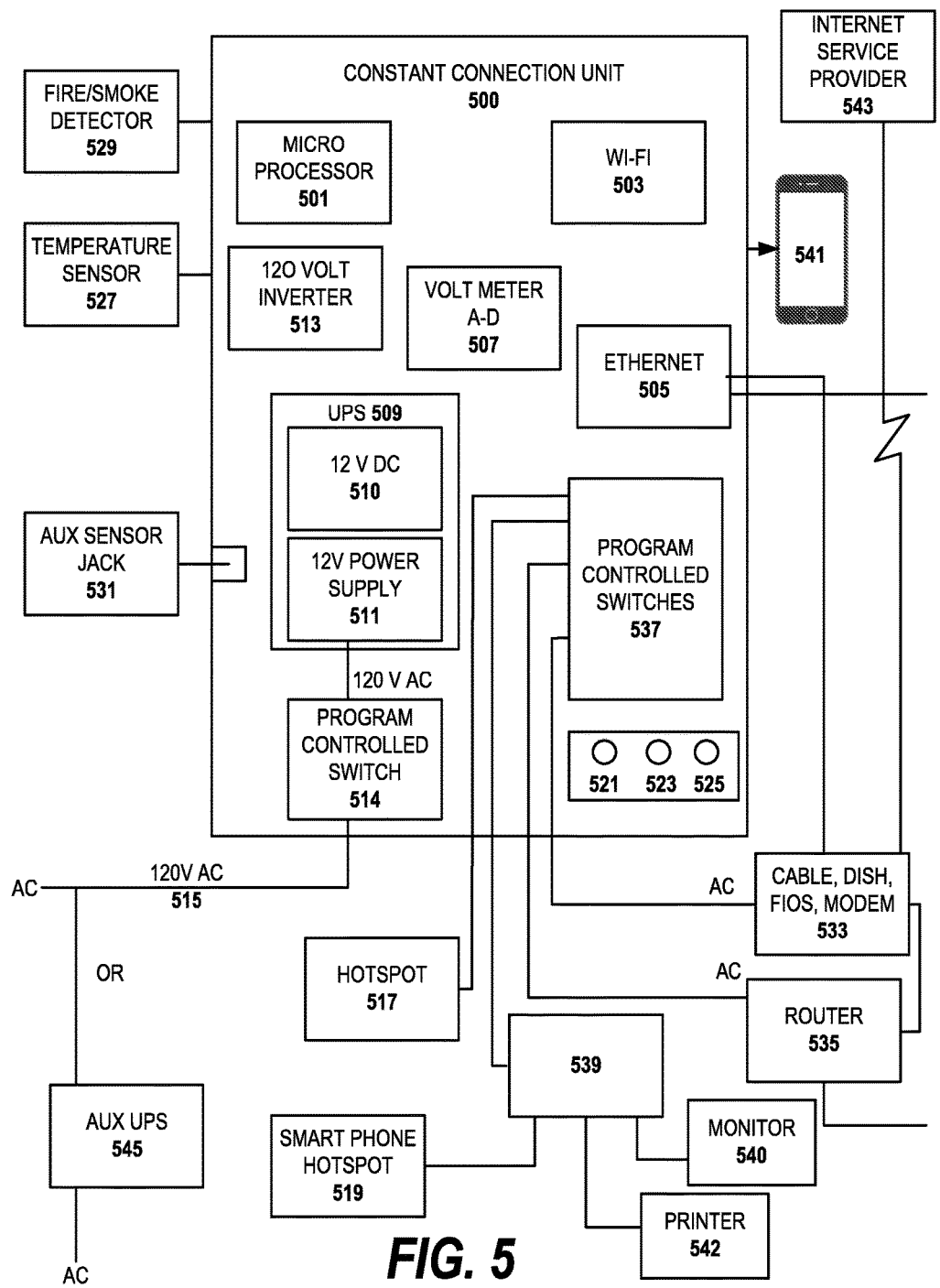
FIG. 5 shows a constant connection system according to a preferred embodiment.

FIG. 5 shows a smart connector (constant connection unit) according to a preferred embodiment. In some embodiments, the constant connection unit 500 maintains Internet service and power through conditions that cause Internet outages. Referring to FIG. 5, certain components are located within the smart connector or constant connection unit 500 while other depicted components are part of the overall Internet hub which provides Internet connectivity. Microprocessor system 501 stores an embedded Linux operating system as well as the firmware which performs the monitoring and tests which the system performs.

The Wi-Fi unit 503 maintains a Wi-Fi connection with Wi-Fi enabled components. Two wired-Ethernet ports 505 maintain Ethernet connections via Ethernet. An internal voltmeter 507 monitors the battery/voltage of system components. A DC UPS 509 comprises a large battery 510 and a 120V AC to 12V DC power supply 511 which provides 12 V DC power to other components of the system in the event of power failure. A 12 V DC to 120 V AC inverter 513 converts battery power to AC voltage. A switch 514, under program control, cuts power to UPS upon command from the microprocessor 501. The switch 514 resets to closed (on) during a power failure to the unit. Optionally, the system includes AC plugs 537 under program control to reset devices such as hotspot 517 and cable, dish, FIOS modem device(s) 533 as well as router 535. The AC plugs can also control other AC power 539, e.g., a power strip, which powers other devices such as monitor 540 and printer 542. The AC cord 515 connects to an AC wall outlet and/or optional auxiliary UPS 545.

The optional dedicated hotspot or Smartphone hotspot 517 allows embodiments of the invention to reroute the Internet connection. Also optionally, the system can include a set of LEDs which indicate system status, e.g., Green LED 521, Yellow LED 523 and Red LED 525. Other optional sensors such as temperature sensor 527, fire/smoke sensor 529, and auxiliary sensor jack 531 can be used to monitor the system environment. The modular sensor connection for auxiliary sensors 531 can be used as an input for water, sound, and other sensors in a home automation system. A water sensor is used to detect leaks, a sound sensor detects environmental conditions such a failing system fans. Other sensors such as motion, light, amp meter and pressure sensors can be coupled to sensor jack 531. An optional rooftop cellular-signal repeater is used for areas with poor cell-signal strength.

In embodiments of the invention, the system sends instant messaging texts containing system status and suggested remedial actions to a user smart phone 541 via Wi-Fi unit 503 or smartphone hotspot 519. Internet Service Provider 543 is shown coupled to the cable, dish, FIOS modem device(s) 533. The reader will understand that in most implementations of the invention the cable, dish, FIOS modem device(s) are alternatives, rarely will all three be in the same Internet hub.

By having an integrated UPS, the smart connector can be programmed for UPS failure self-test, UPS battery health monitoring and UPS battery maintenance to extend its life as discussed above. Also, as is discussed above, the system is programmed for constant testing for Internet outages and constant testing of network performance degradation. The system provides transparent rerouting through available hotspots during Internet outages without other devices having to reselect their wireless network. Further, in preferred embodiments of the invention, the system is programmed to automatically reboot the modem and router in the event of detected problems which fixes most connectivity issues. In one preferred embodiment, the system brings them up in sequence, first the modem, then the router, with a pause after restoring power to the modem.

The present invention has many advantages over the prior art. By providing processes to test for Internet outages and degradation the constant connection system performs constant monitoring for Internet connectivity prevent interruptions before they occur. The constant connection system tests Wi-Fi system, wired router, modem and the ISP connections sequentially. If the pings respond normally and there is non-jittery audio streaming (good performance) then the monitoring is resumed. The constant connection system also removes the burden of troubleshooting from the user by taking action if the connections or performance are out of spec. In preferred embodiments, the general actions are that if CC system detects network connectivity or degradation issues, it reboots the modem, router or other peripherals. Connectivity is tested by pinging Internet servers; performance degradation can be detected by audio streaming or other large files. If the reboot fails to resolve the problem, the system attempts to isolate the problem and reroute the Internet connectivity around the problem. For example, the system tests to determine if Wi-Fi broadcasting has failed. If so, the system bypasses Wi-Fi broadcast by using a connection via wire to a router wired to a modem and then to the ISP. Alternatively, if the system test reveals that the router has failed, the system bypasses the router to test if it is working. The constant connection system is wired to a modem and then to the ISP. Further tests reveal if the modem failed or if the ISP service is down.

Further, the constant connection system programmatically self-tests the components which maintain the Internet connection. For example, the system monitors UPS-battery voltage. To test UPS operation, the system cuts power to UPS to test if it is operational through an AC power outage. The constant connection system includes a smart UPS with self-test, constant monitoring and periodic battery conditioning. The constant connection system also provides user notification of anomalous conditions by reporting events and issues via instant messaging.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise, various steps may be omitted, repeated, combined, or performed in parallel, as necessary, to achieve the same or similar objectives. Similarly, the systems described need not necessarily include all parts described in the embodiments, and may also include other parts not described in the preferred embodiments. Accordingly, the embodiments are not limited to the above-described details, but instead are defined by the appended claims in light of their full scope of equivalents.

The invention claimed is:

1. A method for protecting a computer system performed by a smart connector, the method comprising:
testing an Internet connection provided by an Internet hub;
rebooting the Internet hub if the testing detects a problem in the Internet connection;
testing the Internet connection after rebooting the Internet hub, wherein testing the Internet connection comprises:
setting a state of the Internet connection as failed;
pinging an Internet site;
if a response to the pinging is received:
changing the state to degraded;
requesting a large file from the Internet site;
changing the state to healthy if the large file is received within a pre-determined time; and
sending a hub problem notification if the problem persists after rebooting the Internet hub, wherein the state is reported as a problem in the hub problem notification if the state is failed or degraded.

2. The method of claim 1, further comprising if the problem persists, providing a connection through a hotspot to the Internet hub.

3. The method of claim 1, wherein:
the smart connector includes an uninterrupted power supply (UPS) for supplying power to the smart connector; and
the smart connector supplies power to at least one unit in the Internet hub.

4. The method of claim 3, wherein the method further comprises monitoring the UPS, wherein monitoring the UPS comprises:
measuring a voltage output of the UPS; and
sending a UPS degradation notification if the voltage drops below a threshold.

5. The method of claim 3, wherein the UPS includes an internal UPS battery, and the method further comprises:
optimizing the internal UPS battery, wherein optimizing the internal UPS battery comprises:
draining the internal UPS battery to 20% of its battery life; and
recharging the internal UPS battery.

6. The method of claim 3, wherein the UPS is connected to an external power supply through a timed switch, wherein the timed switch reconnects after a preset time if the timed switch is disconnected, and the method further comprises:
testing for a UPS failure, and testing for the UPS failure comprises:
setting a UPS failure test time to present time;
cutting the external power to the UPS by disconnecting the timed switch;
if the smart connector continues operating with no interruption: reconnecting the timed switch;
setting the UPS failure test time to a large number;
sending a healthy UPS notification;
otherwise:
automatically rebooting the smart connector;
reading a time of the last reboot of the smart connector;
if the time of the last reboot of the smart connector is after the UPS failure test time, sending a failed UPS notification.

7. A method for protecting a computer system performed by a smart connector, the method comprising:
testing an Internet connection provided by an Internet hub, wherein the Internet hub includes a modem and a wireless router;
rebooting the Internet hub if the testing detects a problem in the Internet connection;
testing the Internet connection after rebooting the Internet hub;
sending a hub problem notification if the problem persists after rebooting the Internet hub;
rebooting the Internet hub includes rebooting the modem and rebooting the wireless router;
testing the Internet connection provided by the Internet hub;
if the testing detects a problem after rebooting the Internet hub, isolating the modem by rebooting the modem and testing a direct Internet connection through the modem; and
if the direct Internet connection fails, sending a modem problem notification.

8. The method of claim 7, further comprising:
if the direct Internet connection is healthy, rebooting the wireless router; testing a wireless Internet connection through the wireless router; and if the wireless Internet connection fails, sending a router problem notification.

9. The method of claim 7, further comprising if the problem persists, providing a connection through a hotspot to the Internet hub.

10. The method of claim 7, wherein:
the smart connector includes an uninterrupted power supply (UPS) for supplying power to the smart connector; and
the smart connector supplies power to at least one unit in the Internet hub.

11. The method of claim 10, wherein the method further comprises monitoring the UPS, wherein monitoring the UPS comprises:
measuring a voltage output of the UPS; and
sending a UPS degradation notification if the voltage drops below a threshold.

12. A smart connector for protecting a computer system, the smart connector comprising:
at least one microprocessor;
an uninterrupted power supply (UPS) supplying power to the smart connector;
a timed switch connecting the UPS to an external power supply;
a power output for supplying power to at least one unit in the computer system;
an Internet connection to an Internet hub in the computer system;
a connection to an Internet hot spot; and
wherein the microprocessor is configured to perform the method of:
testing an Internet connection provided by an Internet hub;
rebooting the Internet hub if the testing detects a problem in the Internet connection;
testing the Internet connection after rebooting the Internet hub;
setting a state of the Internet connection as failed;
pinging an Internet site;
if a response to the pinging is received:
changing the state to degraded;
requesting a large file from the Internet site;
changing the state to healthy if the large file is received within a predetermined time; and
sending a hub problem notification if the problem persists after rebooting the Internet hub, wherein the state is reported as a problem in the hub problem notification if the state is failed or degraded.

13. The smart connector of claim 12, wherein the microprocessor is further configured to perform the method of providing a connection through a hotspot to the Internet hub.

14. The smart connector of claim 12, wherein the microprocessor is further configured to perform the method of:
monitoring the UPS, wherein monitoring the UPS comprises:
measuring a voltage output of the UPS; and
sending a UPS degradation notification if the voltage drops below a threshold.

15. The smart connector of claim 12, wherein the UPS comprises an internal UPS battery, wherein the microprocessor is further configured to perform the method of:
optimizing the internal UPS battery, wherein optimizing the internal UPS battery comprises:
draining the internal UPS battery to 20% of its battery life; and
recharging the internal UPS battery.

16. The smart connector of claim 12, wherein the timed switch reconnects after a preset time if the timed switch is disconnected, wherein the microprocessor is further configured to perform the method of:
testing for a UPS failure, and testing for the UPS failure comprises:
setting a UPS failure test time to present time;
cutting the external power to the UPS by disconnecting the timed switch;
if the smart connector continues operating with no interruption: reconnecting the timed switch;
setting the UPS failure test time to a large number;
sending a healthy UPS notification;
otherwise:
automatically rebooting the smart connector;
reading a time of the last reboot of the smart connector;
if the time of the last reboot of the smart connector is after the UPS failure test time, sending a failed UPS notification.

17. A smart connector for protecting a computer system, the smart connector comprising:
at least one microprocessor;
an uninterrupted power supply (UPS) supplying power to the smart connector;
a timed switch connecting the UPS to an external power supply;
a power output for supplying power to at least one unit in the computer system;
an Internet connection to an Internet hub in the computer system, wherein the Internet hub includes a modem and a wireless router;
a connection to an Internet hot spot; and
wherein the microprocessor is configured to perform the method of:
testing an Internet connection provided by an Internet hub;
rebooting the Internet hub if the testing detects a problem in the Internet connection;
testing the Internet connection after rebooting the Internet hub;
sending a hub problem notification if the problem persists after rebooting the Internet hub;
rebooting the Internet hub includes rebooting the modem and rebooting the wireless router;
testing the Internet connection provided by the Internet hub;
if the testing detects a problem after rebooting the Internet hub, isolating the modem by rebooting the modem and testing a direct Internet connection through the modem; and if the direct Internet connection fails, sending a modem problem notification.

18. The smart connector of claim 17, wherein the microprocessor is further configured to perform the method of:
if the direct Internet connection is healthy, rebooting the wireless router;
testing a wireless Internet connection through the wireless router; and
if the wireless Internet connection fails, sending a router problem notification.

19. The smart connector of claim 17, wherein the microprocessor is further configured to perform the method of providing a connection through a hotspot to the Internet hub.

20. The smart connector of claim 17, wherein the microprocessor is further configured to perform the method of:
monitoring the UPS, wherein monitoring the UPS comprises:
measuring a voltage output of the UPS; and
sending a UPS degradation notification if the voltage drops below a threshold.

* * * * *